(12) United States Patent
Swanson

(10) Patent No.: US 11,776,437 B2
(45) Date of Patent: *Oct. 3, 2023

(54) SYSTEM AND METHOD FOR WIRELESS CONTROL OF SIGNS

(71) Applicant: Luminator Holding LP, Plano, TX (US)

(72) Inventor: Rick Swanson, Plano, TX (US)

(73) Assignee: LUMINATOR HOLDING LP, Plano, TX (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/380,817

(22) Filed: Jul. 20, 2021

(65) Prior Publication Data

US 2021/0350729 A1 Nov. 11, 2021

Related U.S. Application Data

(63) Continuation of application No. 16/741,216, filed on Jan. 13, 2020, now Pat. No. 11,100,823, which is a
(Continued)

(51) Int. Cl.
G09F 21/04 (2006.01)
B60Q 1/26 (2006.01)
(Continued)

(52) U.S. Cl.
CPC .............. G09F 21/048 (2013.01); B60Q 1/26 (2013.01); G06F 13/10 (2013.01); G08C 17/02 (2013.01);
(Continued)

(58) Field of Classification Search
CPC ........ G09F 21/048; G09F 21/04; H04W 4/42; H04W 56/001; G06F 13/10;
(Continued)

(56) References Cited

U.S. PATENT DOCUMENTS 5,218,629 A * 6/1993 Dumond, Jr. ........... H04W 4/42
340/904
5,444,390 A 8/1995 Bartlett et al.
(Continued)

FOREIGN PATENT DOCUMENTS

CN 2168760 Y 6/1994
CN 2393752 Y 8/2000
(Continued)

OTHER PUBLICATIONS

U.S. Appl. No. 13/035,633, Swanson, Rick.
(Continued)

*Primary Examiner* — Dale W Hilgendorf
(74) *Attorney, Agent, or Firm* — Fredrikson & Byron, P.A.

(57) ABSTRACT

A system includes a master controller disposed on a transit vehicle, a peripheral device disposed on the transit vehicle, a first wireless subsystem communicably coupled to the master controller, and a second wireless subsystem communicably coupled to the peripheral device. The master controller is operable to send a signal to the peripheral device via the first wireless subsystem, the signal comprising a command related to operation of the peripheral device. The peripheral device is operable to receive the signal via the second wireless subsystem and execute the command. The system utilizes a wireless protocol that specifies a unique identification for the system. The master controller and the peripheral device are each configured via the wireless protocol. The configuration includes storage of the unique identification and operability to restrict wireless communication to wireless communication with other devices so configured.

20 Claims, 7 Drawing Sheets

Related U.S. Application Data continuation of application No. 15/816,760, filed on Nov. 17, 2017, now Pat. No. 10,607,517, which is a continuation of application No. 13/035,633, filed on Feb. 25, 2011, now Pat. No. 9,852,670.

(60) Provisional application No. 61/308,187, filed on Feb. 25, 2010.

(51) Int. Cl.

| | |
|---|---|
| *G08C 17/02* | (2006.01) |
| *H04W 4/42* | (2018.01) |
| *G06F 13/10* | (2006.01) |
| *H04B 1/69* | (2011.01) |
| *H04W 56/00* | (2009.01) |

(52) U.S. Cl.
CPC ............... *G09F 21/04* (2013.01); *H04B 1/69* (2013.01); *H04W 4/42* (2018.02); *H04W 56/001* (2013.01); *G06F 2213/40* (2013.01); *G08C 2201/20* (2013.01)

(58) Field of Classification Search
CPC ......... G06F 2213/40; H04B 1/69; B60Q 1/26; G08C 17/02; G08C 2201/20
See application file for complete search history.

(56) References Cited

U.S. PATENT DOCUMENTS

| | | | |
|---|---|---|---|
| 5,681,015 A | 10/1997 | Kull | |
| 5,905,434 A * | 5/1999 | Steffan | B60Q 1/50 |
| | | | 116/28 R |
| 6,147,617 A | 11/2000 | Kim | |
| 6,414,650 B1 | 7/2002 | Nicholson et al. | |
| 6,437,692 B1 * | 8/2002 | Petite | H04L 9/40 |
| | | | 702/56 |
| 6,473,677 B1 | 10/2002 | Hershey et al. | |
| 6,674,357 B1 * | 1/2004 | Bermel | H04W 84/022 |
| | | | 340/7.45 |
| 6,812,851 B1 | 11/2004 | Dukach et al. | |
| 6,888,454 B2 | 5/2005 | Kurose | |
| 6,915,209 B1 | 7/2005 | Spann | |
| 6,921,892 B2 | 7/2005 | Colbeth et al. | |
| 6,965,307 B2 | 11/2005 | Pearson, Jr. et al. | |
| 7,089,099 B2 | 8/2006 | Shostak et al. | |
| 7,103,460 B1 * | 9/2006 | Breed | G07C 5/008 |
| | | | 706/15 |
| 7,129,856 B2 | 10/2006 | Hering | |
| 7,142,104 B1 * | 11/2006 | Blueford | B60R 11/0235 |
| | | | 340/471 |
| 7,478,492 B2 | 1/2009 | Madonia | |
| 9,852,670 B2 * | 12/2017 | Swanson | H04W 56/001 |
| 10,607,517 B2 * | 3/2020 | Swanson | G06F 13/10 |
| 11,100,823 B2 * | 8/2021 | Swanson | G09F 21/04 |
| 2002/0009978 A1 | 1/2002 | Dukach et al. | |
| 2002/0037715 A1 | 3/2002 | Mauney et al. | |
| 2002/0159434 A1 | 10/2002 | Gosior et al. | |
| 2003/0113007 A1 | 6/2003 | Iwasaki et al. | |
| 2003/0188185 A1 | 10/2003 | Banerjee et al. | |
| 2004/0118991 A1 | 6/2004 | Colbeth et al. | |
| 2004/0263340 A1 | 12/2004 | Pearson et al. | |
| 2005/0020299 A1 | 1/2005 | Malone et al. | |
| 2005/0104747 A1 | 5/2005 | Silic et al. | |
| 2005/0192727 A1 * | 9/2005 | Shostak | G07C 5/0808 |
| | | | 701/1 |
| 2006/0025897 A1 * | 2/2006 | Shostak | G08G 1/017 |
| | | | 701/1 |
| 2006/0089145 A1 | 4/2006 | Chen et al. | |
| 2006/0001117 A1 | 5/2006 | Stokes et al. | |
| 2006/0126857 A1 | 6/2006 | Pavlov et al. | |
| 2006/0213100 A1 * | 9/2006 | McCann | G09F 21/04 |
| | | | 40/591 |
| 2007/0015485 A1 | 1/2007 | DeBiasio et al. | |
| 2007/0139183 A1 | 6/2007 | Kates | |
| 2007/0159750 A1 | 7/2007 | Peker et al. | |
| 2007/0241988 A1 | 10/2007 | Zerphy et al. | |
| 2007/0272831 A1 | 11/2007 | Dailey et al. | |
| 2008/0055287 A1 * | 3/2008 | Ishikawa | H04N 9/3185 |
| | | | 345/204 |
| 2008/0100561 A1 | 5/2008 | Price et al. | |
| 2008/0117144 A1 | 5/2008 | Nakano et al. | |
| 2008/0198098 A1 | 8/2008 | Gelbman et al. | |
| 2009/0046033 A1 | 2/2009 | Siegel | |
| 2010/0042285 A1 | 2/2010 | Abernethy, Jr. et al. | |

FOREIGN PATENT DOCUMENTS

| | | | | |
|---|---|---|---|---|
| CN | 1341321 A | 3/2002 | | |
| CN | 2537090 Y | 2/2003 | | |
| CN | 1462373 A | 12/2003 | | |
| CN | 2631847 Y | 8/2004 | | |
| CN | 1549001 A | 11/2004 | | |
| CN | 1648643 A | 8/2005 | | |
| CN | 1988170 A | 6/2007 | | |
| CN | 201294071 Y | 8/2009 | | |
| DE | 10202928 A1 * | 7/2003 | ........... | B60R 16/037 |
| EP | 1416462 A1 | 5/2004 | | |
| EP | 1538588 A2 | 6/2005 | | |
| EP | 1801776 A1 | 6/2007 | | |
| EP | 2048642 A1 | 4/2009 | | |
| EP | 2361654 A1 * | 8/2011 | ............. | A61N 1/025 |
| JP | H05324307 A | 12/1993 | | |

OTHER PUBLICATIONS

U.S. Appl. No. 12/964,595, Safavi, Ramin.
Copenheaver, Blaine R., "International Search Report" for PCT/US2010/059749 dated Feb. 11, 2011, 3 pages.
Copenheaver, Blaine R., "International Search Report" for PCT/US2011/026302 dated Apr. 19, 2011. (3 Pages).
Bluetooth, "Specification of the Bluetooth System", Specification vol. 1, Version 1.1, Feb. 22, 2001, pp. 1-3, 19-23, 41-43, 47-54, 57, 92, 104, 109, 110, 120, 138, 143, and 921.
Bluetooth, "Specification of the Bluetooth System", Specification vol. 1, Version 1.1, Feb. 22, 2001, additional pp. 45, 148, 149, 164, and 962-974.
Bluetooth, "Specification of the Bluetooth System", Specification vol. 1, Version 1.1, Feb. 22, 2001; 1,084 pages.

* cited by examiner

| Time slot | ODK | Master | Slave | Sign | Notes |
|---|---|---|---|---|---|
| 1 | | Sync ⟶ | | | Send 100 sync |
| 2 | | Sync ⟶ | | | commands after |
| | | : | | | power up to |
| 100 | | Sync ⟶ | | | synchronize slaves |
| 101 | data ⟶ | Data, seq = 0 ⟶ | | | No response if errors |
| 102 | | Data, seq = 0 ⟶ | | | Resend if no response |
| | | ⟵ Ack | | | Acknowledge if no error |
| 103 | | Poll, seq = 1 ⟶ | data ⟶ | | |
| 104 | | Poll, seq = 1 ⟶ | ⟵ data | | |
| 105 | | Poll, seq = 1 ⟶ | | | |
| | ⟵ data | ⟵ Response | | | |
| 106 | | | | | |
| 107 | | | | | |
| 108 | | sync ⟶ | | | Send sync commands |
| 109 | | | | | periodically when idle |
| 110 | | sync ⟶ | | | |
| 111 | data ⟶ | Data, seq = 2 ⟶ | | | |
| | | ⟵ Ack | data ⟶ | | |
| 112 | data ⟶ | Data, seq = 3 ⟶ | | | |
| | | ⟵ Ack | data ⟶ | | |
| 113 | data ⟶ | Data, seq = 0 ⟶ | | | |
| | | ⟵ Ack | data ⟶ | | |
| 114 | | | | | |

Figure 4

SYSTEM AND METHOD FOR WIRELESS CONTROL OF SIGNS

CROSS-REFERENCE TO RELATED APPLICATIONS

This application is a continuation of U.S. patent application Ser. No. 16/741,216 filed on Jan. 13, 2020, which is now U.S. Pat. No. 11,100,823. U.S. patent application Ser. No. 16/741,216 is a continuation of U.S. patent application Ser. No. 15/816,760 filed on Nov. 17, 2017, which is now U.S. Pat. No. 10,607,517. U.S. patent application Ser. No. 15/816,760 is a continuation of U.S. patent application Ser. No. 13/035,633 filed on Feb. 25, 2011, which is now U.S. Pat. No. 9,852,670. U.S. patent application Ser. No. 13/035,633 claims priority from U.S. Provisional Application No. 61/308,187 filed on Feb. 25, 2010. This application incorporates by reference the entire disclosures of U.S. patent application Ser. No. 16/741,216, U.S. patent application Ser. No. 15/816,760, U.S. patent application Ser. No. 13/035,633, U.S. Provisional Application No. 61/308,187 and U.S. patent application Ser. No. 12/964,595.

BACKGROUND

Technical Field

The present invention relates in general to control systems for peripheral devices, and more particularly, but not by way of limitation, to systems and methods for wireless control of peripheral devices including, but not limited to, electronic signs disposed relative to transit vehicles.

History of Related Art

Signage is a critical aspect of communication in our organized society. Signage used in the public-transit industry is a well known example of this critical use. A plurality of signs may often be positioned in and/or around a bus, train, or other mode of transit to display information to passengers, potential passengers, and/or other observers. For example, busses often display route information on signs disposed on the outside of busses so the sign information can easily be observed. Rider decisions are often based on such signs. The information may include the name of the route that particular bus is servicing. In that way, potential passengers waiting at a bus stop will know which bus to board.

In early days of mass transportation, bus operators often used a placard displaying a route number which was placed in a window of the bus. Eventually, such placards were replaced by electronic signs capable of displaying a selected route number thereon. To power the electronic signs on the bus, a power cord had to be run to each electronic sign. A route number to be displayed also had to be input into the electronic signs. The route number could either be manually input into each electronic sign or a communication link had to be hardwired from a control box to each sign to be controlled.

More advanced hardwired systems have utilized master and slave module configurations. For example, various prior art systems include several peripheral (slave) modules and a master controller. The master may be hardwired to the slave modules with a RS-485 bus. The master may control the slave peripherals utilizing a serial protocol such as wired RS-485 communications operating at 19200 Baud. The communication protocol may be based on the Intel Hex protocol using ASCII characters.

Hardwiring a control box to a plurality of electronic signs presents a number of drawbacks. For example, the wires for communicating with the signs cost money to manufacture and install into the busses. Additionally, the wires for communicating with the signs add additional weight to the busses. Additional weight increases fuel consumption, thereby increasing the cost to operate the busses. Another issue is the difficulty in maintaining and/or replacing the wires.

SUMMARY OF THE INVENTION

In one embodiment, a system includes a master controller disposed on a transit vehicle, a peripheral device disposed on the transit vehicle, a first wireless subsystem communicably coupled to the master controller, and a second wireless subsystem communicably coupled to the peripheral device. The master controller is operable to send a signal to the peripheral device via the first wireless subsystem, the signal comprising a command related to operation of the peripheral device. The peripheral device is operable to receive the signal via the second wireless subsystem and execute the command. The system utilizes a wireless protocol that specifies a unique identification for the system. The master controller and the peripheral device are each configured via the wireless protocol. The configuration includes storage of the unique identification and operability to restrict wireless communication to wireless communication with other devices so configured.

In one embodiment, a method includes providing a wireless-communication system on a transit vehicle. The wireless-communication system includes a master controller disposed on the transit vehicle, a peripheral device disposed on the transit vehicle, a first wireless subsystem communicably coupled to the master controller, and a second wireless subsystem communicably coupled to the peripheral device. The method further includes configuring the master controller and the peripheral device via a wireless protocol for the wireless-communication system. The configuring includes storing a unique identification for the wireless-communication system and restricting wireless communication to wireless communication to other devices so configured. The method additionally includes sending a signal by the master controller via the first wireless subsystem, the signal comprising a command related to operation of the peripheral device. Further, the method includes receiving the signal at the peripheral device via the second wireless subsystem and executing the command at the peripheral device.

The above summary of the invention is not intended to represent each embodiment or every aspect of the present invention. It should be understood that the various embodiments disclosed herein can be combined or modified without changing the spirit and scope of the invention.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 4 illustrates a process of sending data to/from a control panel and a slave peripheral device;

DETAILED DESCRIPTION OF ILLUSTRATIVE EMBODIMENTS

In various embodiments, wireless control of peripheral devices on a transit vehicle may be facilitated. For purposes of this patent application, a "peripheral device" may be considered a device that is attached or installed, for example, on a transit vehicle and expands the transit vehicle's capabilities. Peripheral devices may include, for example, lights, signs, audio and/or video components, climate-control systems, and the like. A "transit vehicle," as used herein, includes, but is not limited to, land, water, or air-based vessels or vehicles including, but not limited to, water vessels, aircraft, and land-based vehicles (e.g., busses or trains).

Figure 1:
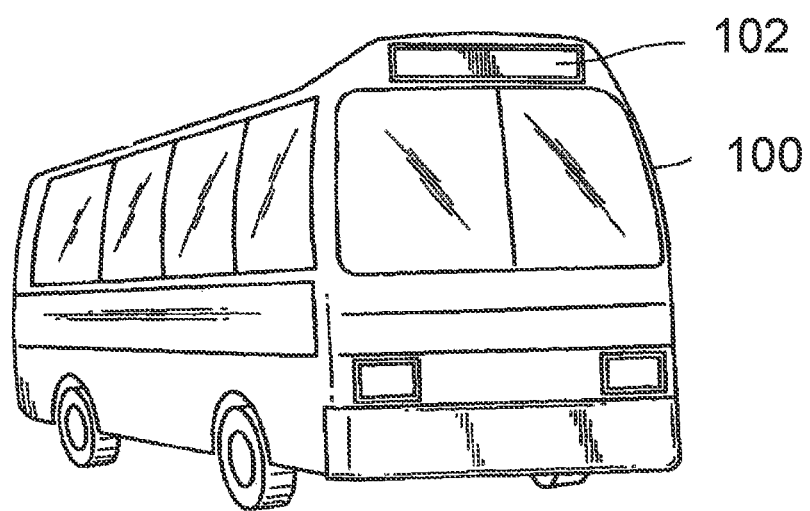
FIG. 1 is a perspective view of a bus utilizing an embodiment of a wireless system.

FIG. 1 illustrates a bus 100. Although the bus 100 is depicted in FIG. 1, it is contemplated that other types of transit vehicles may also be used such as, for example, a train or an airplane. A sign 102 is shown on the bus 100. The sign 102 typically displays information pertaining to a route, such as, for example, a route number or route name. However, other information could be displayed by the sign 102. As one of ordinary skill in the art will appreciate, a transit vehicle such as, for example, the bus 100, may have a plurality of signs similar to the sign 102 thereon. For example, a transit vehicle may have a sign similar to the sign 102 on each of a front, middle, and left and right sides of the transit vehicle. By way of further example, the transit vehicle may have one or more signs similar to the sign 102 inside the transit vehicle. Typically, information to be displayed by the sign 102 is programmed remotely by a wired master control, or manually on a control panel located on the sign 102. In various embodiments, information may be displayed by the sign 102 in a wireless configuration.

Figures 2A, 3:
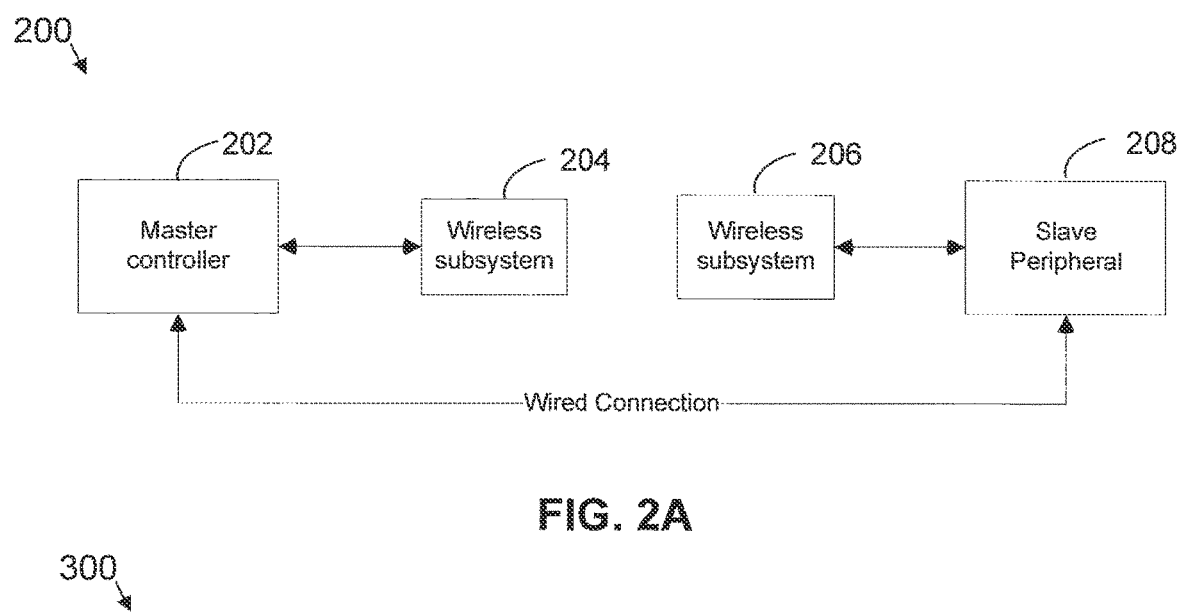
FIG. 2A is a block diagram of an embodiment of a wireless system.
FIG. 3 is a table showing an exemplary embodiment of a wireless packet format.

FIG. 2A illustrates a wireless-communication system 200. The wireless-communication system 200 is shown in an exemplary embodiment. A master controller (device) 202 is connected to a wireless subsystem 204. A wireless subsystem 206, which is in communication with the wireless subsystem 204, is connected to a slave peripheral device 208. The wireless subsystem 206 may be connected to the slave peripheral device 208 via, for example, a wired connection. In various embodiments, the wireless subsystem 206 may be physically part of the slave peripheral device 208 so as not to require a separate wired connection. Similarly, the wireless subsystem 204 may be connected to the master device 202 via a wired connection. In various embodiments, the wireless subsystem 204 may be physically part of the master device 202 so as not to require a separate wired connection.

For simplicity of illustration, only the slave peripheral device 208 is shown. However, in a typical embodiment, the slave peripheral device 208 may represent a plurality of slave peripheral devices, each of which has a wireless subsystem similar to the wireless subsystem 206. For example, in various embodiments, the slave peripheral device 208 may represent a plurality of electronic signs such as, for example, the sign 102 of FIG. 1. By way of further example, the slave peripheral device 208 may represent a plurality of peripheral devices selected from any combination of lights, electronic signs, audio and/or video components, climate-control components, and the like. In a typical embodiment, the master device 202 may include a control panel. In other embodiments, the master device 202 may communicate and receive data from a physically-separate control panel that is communicably coupled to the master device 202.

In operation, the master device 202 sends a signal to the wireless subsystem 204. The signal may include one or more commands such as, for example, commands to adjust operation of the slave peripheral device 208 and/or a plurality of slave peripheral devices that may be present in the system 200. By way of example, the signal may include a command to adjust a brightness of a light, adjust a temperature of a climate-control component, or adjust what is displayed by an electronic sign or an appearance of the electronic sign. In a typical embodiment, the wireless subsystem 204 converts the signal into data packets for wireless transmission. An exemplary data packet format will be described with respect to FIG. 3. The data packets may be compressed in order to minimize an amount of data transmitted. Compression of the data packets can be accomplished in a number of ways including, for example, using binary values instead of ASCII characters and by reducing or eliminating certain fields. The wireless subsystem 206 receives the data packets and then processes the data packets and sends the signal to the slave peripheral device 208. The signal may be processed, for example, by a processor in the peripheral device that causes the commands to be executed by appropriate components of the slave peripheral device 208. In a typical embodiment, the wireless subsystem 204 and the wireless subsystem 206 are operable to transmit data at a rate between 60 and 200 kbps in order to minimize delay spread multi-path effects. Additionally, in a typical embodiment, the wireless-communication system 200 transmits signals at between 1 and 100 milliwatts of radio frequency (RF) power.

In various embodiments, the master device 202 may be directly wired to the slave peripheral device 208 as shown, for example, to program the slave peripheral device 208 with a unique identification (ID) code for the master device 202. In various other embodiments, the master device 202 may be directly wired to the slave peripheral device 208 as shown to support, for example, backwards compatibility with communication protocols, such as, for example, RS-485 communications based on the Intel Hex protocol using ASCII characters and operating at 19200 Baud.

In various embodiments, the wireless-communication system 200 may use a frequency hopping spread spectrum under Federal Communications Commission (FCC) 15.247. A frequency hopping spread spectrum system can transmit data in discrete packets using a different frequency for each successive packet. Alternatively several packets can be sent on the same frequency as long as no frequency is used for longer than 400 msec. Transmit frequencies can be chosen from a pseudo-random list. Alternatively transmit frequencies can be pre-defined. In various embodiments, the wireless-communication system 200 can use direct sequence spread spectrum under FCC 15.247. The wireless-communication system 200 can use several different channels each utilizing direct sequence spread spectrum. In various embodiments, the wireless-communication system 200 can use a combination of direct sequence and frequency hopping spread spectrum. In various embodiments, the wireless-communication system 200 can use one or more fixed frequency RF channels. In various embodiments, the wireless-communication system 200 can use a combination of fixed frequency and/or frequency hopping and/or direct sequence spread spectrum.

In various embodiments, the wireless-communication system 200 may utilize a wireless protocol that includes, for example, methods to send and receive data packets, mitigate errors, choose transmit frequencies, and synchronize operation between the master device 202 and slave peripheral devices such as, for example, the slave peripheral device 208. Due to the possibility of two or more transit vehicles being close enough to each other to cause interference between wireless systems, each wireless-communication system such as, for example, the wireless-communication system 200, can have a unique frequency hopping sequence. If direct sequence spread spectrum is used, each wireless-communication system such as, for example, the wireless-communication system 200, may have a unique spreading code. If fixed frequencies are used, each wireless-communication system such as, for example, the wireless-communication system 200, can use a frequency chosen from a larger group of frequencies.

Figure 2B:
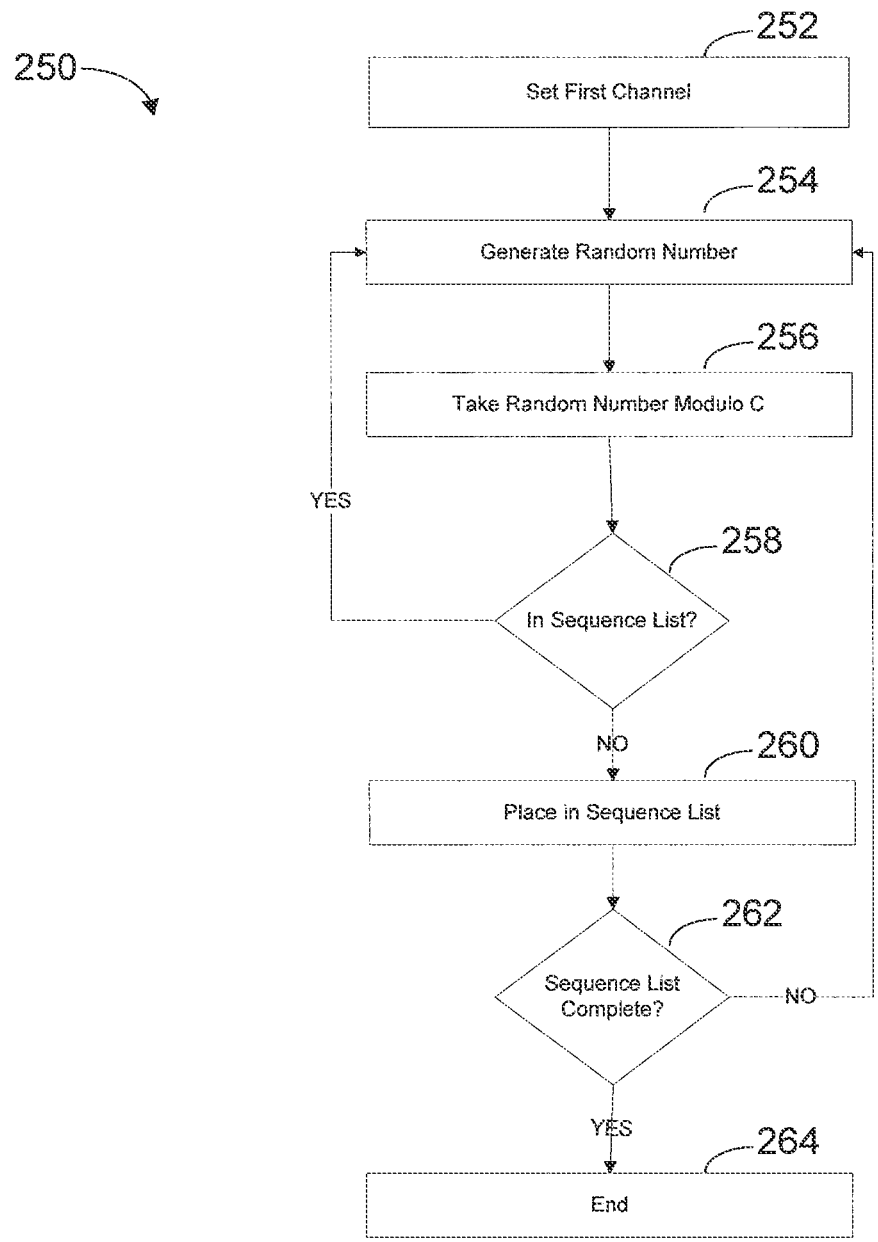
FIG. 2B illustrates a process for building a pseudo-random hopping sequence.

FIG. 2B illustrates a process 250 for building a pseudo-random hopping sequence (i.e., sequence list) according to an exemplary wireless protocol. In a typical embodiment, the process 250 utilizes a unique ID assigned, for example, to a wireless-communication system for a transit vehicle. The unique ID may be, for example, a random number, a sequential number, a number related to a vehicle such as, for example, a bus number or vehicle identification number (VIN), a number related to the product such as, for example, a serial number, a number chosen by a customer, and the like.

For purposes of illustration, the sequence list generated in the process 250 includes twenty-five channels. The process 250 begins at step 252. At step 252, a first channel in the sequence list is set. The first channel is typically fixed at a first available channel in, for example, the 902-928 Mhz band. As described in more detail below, in a typical embodiment, the other twenty-four channels may be chosen via, for example, a random-number generator. After step 252, the process 250 proceeds to step 254.

At step 254, the random-number generator may use the unique ID as a seed to generate a random number. After step 254, the process 250 proceeds to step 256. At step 256, the process 250 may take the random number modulo C to produce a channel candidate, where C is a number of available channels in the 902-928 Mhz band. After step 256, the process 250 proceeds to step 258. At step 258, it is determined whether the channel candidate is already in the sequence list. If the channel candidate is already in the sequence list, the process 250 returns to step 254 for generation of a new random number. Otherwise, if the channel candidate is not already in the sequence list, the process 250 proceeds to step 260.

At step 260, the channel candidate is placed in the sequence list. After step 260, the process 250 proceeds to step 262. At step 262, it is determined whether the sequence list contains twenty-five entries. If the sequences list does not contain twenty-five entries, the process 250 returns to step 254 for generation of a new random number. Otherwise, if the sequences list contains twenty-five entries, the process 250 proceeds to step 264. At step 264, the process 250 ends.

In a typical embodiment, a master device such as, for example, the master device 202 of FIG. 2A, and each slave peripheral device such as, for example, the slave peripheral device 208 of FIG. 2A, execute a same algorithm. In various embodiments, the algorithm may be similar to the process 250. Using the same unique ID and the same algorithm, each device will have an identical sequence list. One of ordinary skill in the art will appreciate that systems with different unique IDs will have different pseudo-random sequences. The sequence list described above is oftentimes called a hop table. The hop table may be used as an index into a table of C equally spaced frequencies in the 902-928 Mhz band. By sequentially indexing through the hop table the system will "hop" in a pseudo-random fashion. The number of available channels in the 902-928 Mhz band depends on the data rate and modulation used. The FCC defines channels as being separated by at least the 20 dB bandwidth of a channel. In various embodiments, there may be, for example, between 50 and 200 available channels.

FIG. 3 illustrates a wireless packet format 300 that may be utilized according to an exemplary wireless protocol. In order to send data packets wirelessly to/from master and slave peripherals, the data packets can be encapsulated in a wireless packet format such as, for example, the wireless packet format 300. As illustrated in FIG. 3 and described in Table 1 below, the wireless packet can contain one or more of the following:

TABLE 1

| FIELD | DESCRIPTION |
|---|---|
| Preamble | A bit sequence of 1's and 0's used to synchronize the receiver's bit recovery clock. |
| Header | A bit sequence used to identify the first byte boundary. |
| ID | A bit field that is common to all devices within a single transit vehicle network and is unique to each transit vehicle network. |
| CMD | A bit field that defines a type or purpose of the packet. |
| Length | A bit field that defines a length of the packet. The length field refers to the length of the data field. |
| Seq # | A bit field that is incremented evely time a new packet is sent. If the packet is a resend of a previous packet the sequence number is not incremented. This allows the receiver to distinguish between new packets and retries |
| Data | Payload. |
| CRC | A cyclic redundancy check, check sum or other bit sequence used to detect errors in the packet |

Other wireless packet formats are possible using different fields and/or a different number of bits for each field.

FIG. 4 illustrates a process 400 of sending data to/from a master device and a slave peripheral device according to an exemplary wireless protocol. In order to synchronize transmitters and receivers in a frequency hopping system, it is generally advisable to keep track of time as well as the hopping sequence. To accomplish this, the exemplary wireless protocol can utilize time slots. A time slot is a predetermined fixed length of time during which a given frequency will be used. Once the slave peripheral device is synchronized to the time slot and hopping frequency, the receiver can determine which frequency to use at any given time in the future without the requirement of receiving every packet. The time slot size can be based on the maximum packet transfer time. Alternatively the time slot can be a multiple of the packet transfer time.

In a typical embodiment, a master device such as, for example, the master device 202 of FIG. 2A, defines time slots by beginning transmission at the start of a time slot. Slave peripheral devices such as, for example, the slave peripheral device 208 of FIG. 2A, receive a transmission from the master device and keep track of the time to the next time slot. At power up, the slave peripheral devices synchronize to the time slot and hopping sequence. To accomplish this, the master device typically sends synchronize messages continuously for a minimum number of time slots before beginning to send data packets. The slave peripheral devices then tune to a pre-determined channel in the hop sequence and listen for a valid transmission from the master device.

A valid transmission is any transmission that contains no errors and matches the unique ID. Once the slave peripheral devices receive a valid packet, the slave peripheral devices start a timer to measure the time to the start of the next time slot. Synchronization may be maintained by resetting the timer each time the slave peripheral devices receive a valid packet. If for any reason the slave peripheral devices lose synchronization, the slave peripheral devices may again tune to the predetermined channel and listen for the master device 202. The number of time slots that can be missed and still remain synchronized depends on the accuracy of the clocks in the master device 202 and the slave peripheral devices, the time slot length, and the guard time. With a 1 msec guard time and a clock accuracy of +/−50 ppm, a slave peripheral device can miss 1250 packets before losing synchronization.

After synchronization between the master device and the slave peripheral device, the master device can send data packets to the slave peripheral devices when, for example, the master device receives data from the control panel (i.e., ODK). When the slave peripheral device receives the data packet from the master device, the slave peripheral device checks the address and CRC, and returns an acknowledgement if the data packet was error free and destined for this slave peripheral device. The slave peripheral device then decompresses the packet and causes execution of commands contained therein by functional components of the slave peripheral device (i.e., sign). After the master device has sent the data packet, the master device will poll the slave peripheral device for return data. In response to a poll command, the slave peripheral device compresses the data the slave peripheral device received, and sends a response packet to the master device.

Figure 5:
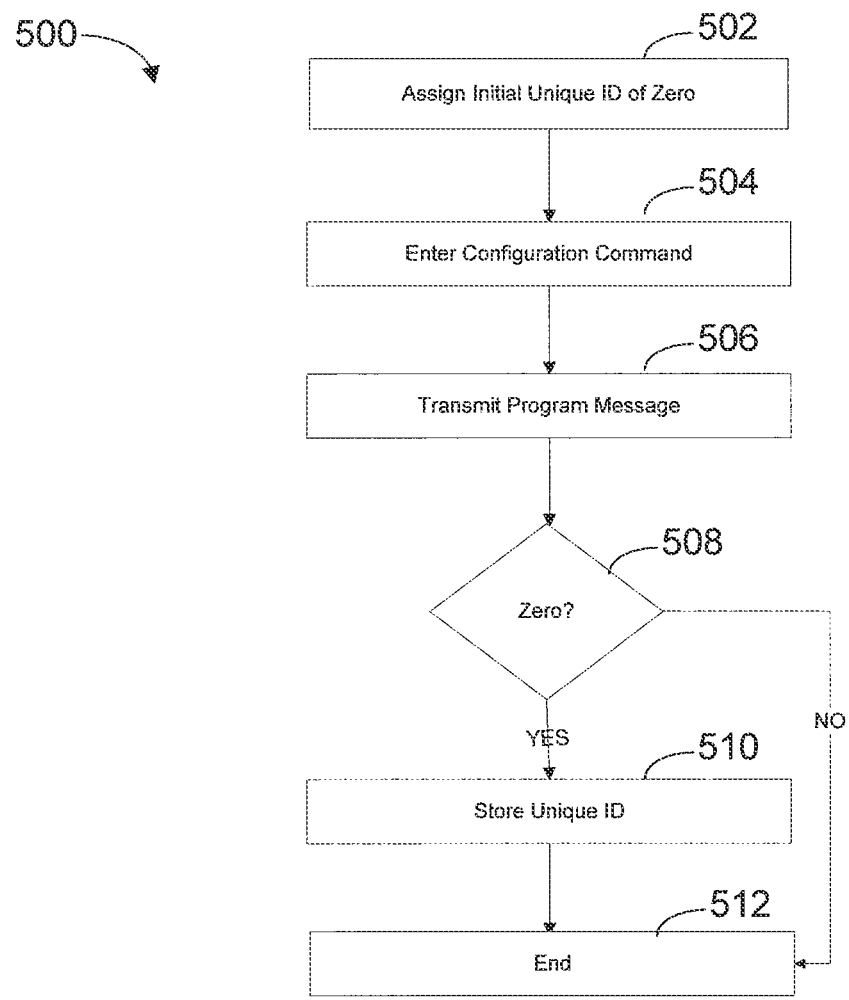
FIG. 5 illustrates an exemplary process for configuring a slave peripheral device.

FIG. 5 illustrates an exemplary process 500 for configuring a slave peripheral device such as, for example, the slave peripheral device 208 of FIG. 2A. As described above, a unique ID may be assigned to each wireless-communication system such as, for example, the wireless communication system 200 of FIG. 2A. Each wireless-communication system generally comprises one master device and at least one slave peripheral device. In a typical embodiment, the unique ID ensures that only devices intended to be a part of the system are allowed to communicate and other devices within range but belonging to a different system cannot exchange data by mistake. In a typical embodiment, the unique ID is uniquely configured in each device when the system is first installed. If a device within a system is ever replaced, a new device can be reprogrammed or resynchronized with the unique ID. In various embodiments, the master device may contain a unique ID when shipped from a factory. Therefore, each slave peripheral device that is in a same wireless-communication system as the master device may be configured according to the unique ID.

At step 502, an initial unique ID of zero may be assigned to the slave peripheral devices. In various embodiments, any slave peripheral devices used by the system may be shipped with the unique ID of zero. After step 502, the process 500 proceeds to step 504. At step 504, after installation of the slave peripheral devices, or in the event of replacement due to upgrade or failure, a configuration command may be entered into the master device and system power may be cycled. After step 504, the process 500 proceeds to step 506.

At step 506, when the master device powers up the first time, the master device transmits a program message, instead of the sync message described with respect to FIG. 4, one-hundred times before resuming normal operation. The program message typically contains the master device's unique ID. After step 506, the process 500 proceeds to step 508.

At step 508, when the slave peripheral devices power up, the slave peripheral devices check the unique ID stored in nonvolatile memory. If the unique ID is not zero, the slave peripheral devices use the stored unique ID and only accept messages from the master device containing the unique ID and the process 500 proceeds to step 512. If the unique ID is determined to be zero at step 508, the process 500 proceeds to step 510. At step 510, the slave peripheral devices listen for the program message, for example, on channel one for up to one second. When the slave peripheral devices receive the program message, the slave peripheral devices store the unique ID contained in the program message in nonvolatile memory. After step 510, the process 500 proceeds to step 512. At step 512, the process 500 ends.

In addition to being programmed with a unique ID at the factory, the master device may have the ability to accept a unique ID through a keypad on the master device. Likewise, slave peripheral devices have a switch on the internal circuit card that allows a technician to set the unique ID to zero. A light-emitting diode (LED) indicator indicates the unique ID is set to zero. In addition, peripheral devices may have an internal serial connection (e.g., RS-232 or Universal Serial Bus (USB)) that will allow programming of the unique ID directly. The serial connection and the internal switch is typically placed in such a way that a cover must be removed in order to gain access to these functions.

In various embodiments, various other methods may also be utilized to configure master devices and/or slave peripheral devices. For example, a handheld device can be developed to attach to each slave and/or master device and to program each with the unique ID code. Alternatively a handheld device can be developed to wirelessly communicate with each master device and/or slave peripheral device and program each unit with the unique ID code. In various embodiments, the master device and/or slave peripheral devices may have a push button. For example, when the buttons on the master device and the slave peripheral devices are pushed, the master device may transmit the unique ID code and each slave peripheral device may receive and store the unique ID code.

Additionally, in various embodiments, a wiring cable can be temporarily connected between the master device and slave peripheral devices. Using this cable the master device may program each slave peripheral device with the master device's unique ID code. A module or circuit board containing the unique ID code can also be inserted into each master device and/or slave peripheral device. Each master device and/or slave peripheral device can have a slot or opening or removable cover to facilitate the insertion of the module or circuit board. Each master device and/or slave peripheral device can have a magnetic card reader. A magnetic card with the unique ID code can then be swiped on each device to program the unique ID code into each device. Each master device and/or slave peripheral device can have a RFID reader. A RFID card with the unique ID code can then be presented or attached to each device to program the unique ID code into each device. In various embodiments, the master device and/or slave peripheral devices can be configured with a unique ID code at the factory and sent together to the customer.

Figure 6:
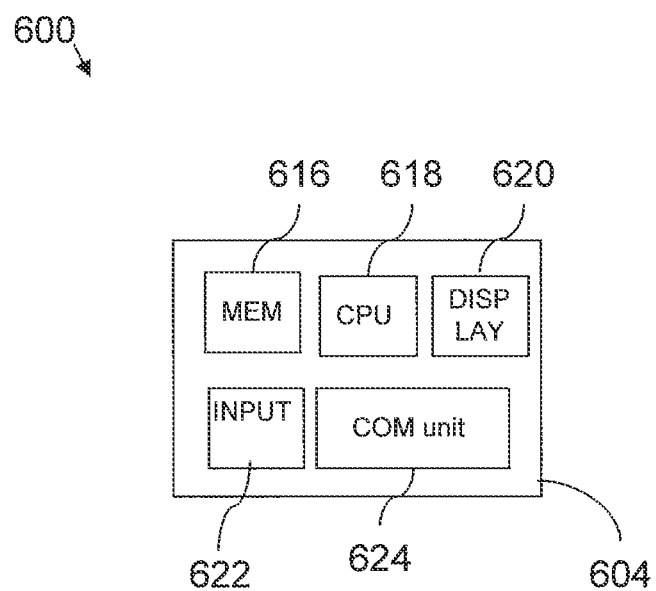
FIG. 6 illustrates an embodiment of a computer.

FIG. 6 illustrates a computer 600 that may be included within a slave peripheral device such as, for example, the slave peripheral device 208 of FIG. 2A and a master device such as, for example, the master device 202 of FIG. 2A. The computer 600 includes memory 616, a central processing unit (CPU) 618, a display 620, an input device 622 and a communication unit 624. Particular embodiments of a master device or a slave peripheral device may omit various components such as, for example, a display 620.

Figure 7:
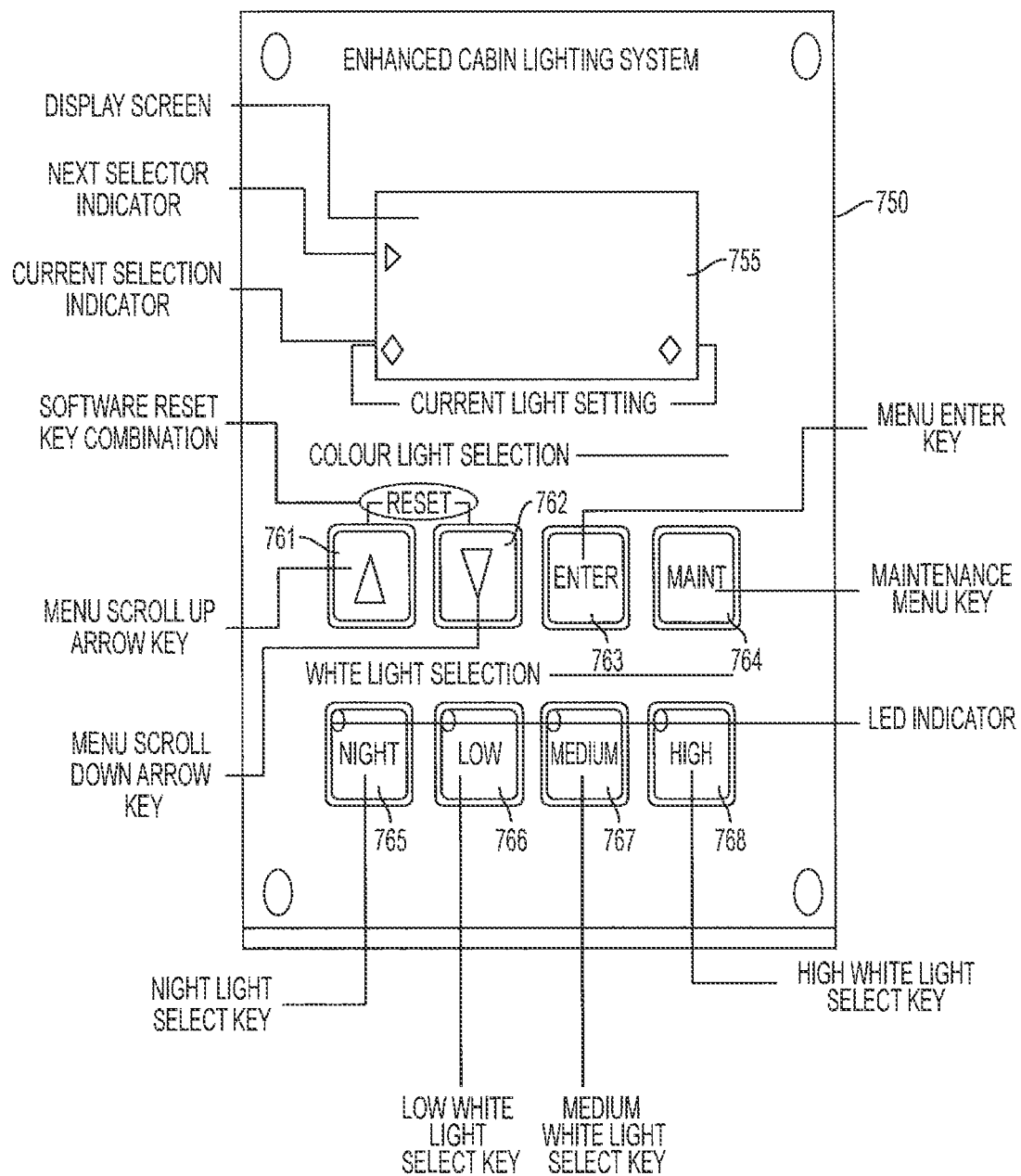
FIG. 7 is a diagram illustrating an embodiment of a cabin-lighting system.

FIG. 7 shows a front panel of an exemplary embodiment of a control panel 750 that may be communicably coupled to a master device such as, for example, the master device 202 of FIG. 2A. In a typical embodiment, the control panel 750 allows a user to adjust the intensity of one or more lights in an interior of a cabin of a transit vehicle. The control panel 750 includes a display 755 and a plurality of buttons 761-768. A pair of buttons 761, 762 are used to scroll up and down a menu structure that is displayed on the display 755 and an ENTER button 763 is used to enter menu selections. A set of buttons 765-768 are used to control the generation of white light. In various embodiments, peripheral devices (e.g., lighting components) may be controlled from the control panel 750.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   on power up, checking, by a transit-vehicle peripheral device, a transit-vehicle peripheral device programmable identifier;
   wherein the transit-vehicle peripheral device programmable identifier is stored as a single value such that:
      a specific initial value indicates that no particular transit-vehicle master controller has been assigned to the transit-vehicle peripheral device; and
      any value other than the specific initial value identifies a particular transit-vehicle master controller of a particular wireless transit-vehicle network that has been assigned to the transit-vehicle peripheral device;
   the transit-vehicle peripheral device wirelessly receiving a command packet;
   the transit-vehicle peripheral device determining whether the command packet includes the transit-vehicle peripheral device programmable identifier;
   responsive to the command packet including the specific initial value, the transit-vehicle peripheral device wirelessly receiving, from a transit-vehicle master controller of a wireless transit-vehicle network, a wireless transit-vehicle network common code that is common to all transit-vehicle peripheral devices within the wireless transit-vehicle network and storing, by the transit-vehicle peripheral device, the wireless transit-vehicle network common code as the transit-vehicle peripheral device programmable identifier, wherein the wireless transit-vehicle network common code replaces the specific initial value; and
   responsive to the command packet not including the transit-vehicle peripheral device programmable identifier, the transit-vehicle peripheral device not accepting the command packet.

2. The method of claim 1 comprising, responsive to a determination that the command packet includes the transit-vehicle peripheral device programmable identifier, the transit-vehicle peripheral device adjusting operation of the transit-vehicle peripheral device as indicated in the command packet.

3. The method of claim 1, wherein the transit-vehicle peripheral device is synchronized to the particular transit-vehicle master controller.

4. The method of claim 3, wherein:
   the transit-vehicle peripheral device comprises at least one of an electronic sign, a light component, a climate-control component, an audio component and a video component; and
   the transit-vehicle peripheral device is operable to receive commands from the particular transit-vehicle master controller.

5. The method of claim 3, wherein the wireless transit-vehicle network common code is factory-established.

6. The method of claim 3, wherein the particular wireless transit-vehicle network uses at least two of frequency hopping, fixed frequency and direct sequence spread spectrum.

7. The method of claim 3, wherein at least some devices within the particular wireless transit-vehicle network transmit data at a rate between 60 and 200 kilobits per second so as to minimize delay spread multi-path effects.

8. The method of claim 3, wherein at least some devices within the particular wireless transit-vehicle network transmit signals at between 1 and 100 milliwatts of radio frequency power.

9. The method of claim 3, wherein the specific initial value is zero.

10. The method of claim 1, wherein the wireless transit-vehicle network common code is indicative of the transit-vehicle peripheral device having the transit-vehicle master controller of the wireless transit-vehicle network assigned thereto.

11. A system comprising a processor and memory, wherein the processor and the memory in combination are operable to implement a method comprising:
   on power up, checking, by a transit-vehicle peripheral device, a transit-vehicle peripheral device programmable identifier;
   wherein the transit-vehicle peripheral device programmable identifier is stored as a single value such that:
      a specific initial value indicates that no particular transit-vehicle master controller has been assigned to the transit-vehicle peripheral device; and
      any value other than the specific initial value identifies a particular transit-vehicle master controller of a particular wireless transit-vehicle network that has been assigned to the transit-vehicle peripheral device;
   the transit-vehicle peripheral device wirelessly receiving a command packet;
   the transit-vehicle peripheral device determining whether the command packet includes the transit-vehicle peripheral device programmable identifier;
   responsive to the command packet including the specific initial value, the transit-vehicle peripheral device wirelessly receiving, from a transit-vehicle master controller of a wireless transit-vehicle network, a wireless transit-vehicle network common code that is common to all transit-vehicle peripheral devices within the wireless transit-vehicle network and storing, by the transit-vehicle peripheral device, the wireless transit-vehicle network common code as the transit-vehicle peripheral device programmable identifier, wherein the wireless transit-vehicle network common code replaces the specific initial value; and responsive to the command packet not including the transit-vehicle peripheral device programmable identifier, the transit-vehicle peripheral device not accepting the command packet.

12. The system of claim 11, the method comprising, responsive to a determination that the command packet includes the transit-vehicle peripheral device programmable identifier, the transit-vehicle peripheral device adjusting operation of the transit-vehicle peripheral device as indicated in the command packet.

13. The system of claim 11, wherein the transit-vehicle peripheral device is synchronized to the particular transit-vehicle master controller.

14. The system of claim 13, wherein:
the transit-vehicle peripheral device comprises at least one of an electronic sign, a light component, a climate-control component, an audio component and a video component; and
the transit-vehicle peripheral device is operable to receive commands from the particular transit-vehicle master controller.

15. The system of claim 13, wherein the wireless transit-vehicle network common code is factory-established.

16. The system of claim 13, wherein the particular wireless transit-vehicle network uses at least two of frequency hopping, fixed frequency and direct sequence spread spectrum.

17. The system of claim 13, wherein at least some devices within the particular wireless transit-vehicle network transmit data at a rate between 60 and 200 kilobits per second so as to minimize delay spread multi-path effects.

18. The system of claim 13, wherein at least some devices within the particular wireless transit-vehicle network transmit signals at between 1 and 100 milliwatts of radio frequency power.

19. The system of claim 11, wherein the wireless transit-vehicle network common code is indicative of the transit-vehicle peripheral device having the transit-vehicle master controller of the wireless transit-vehicle network assigned thereto.

20. A computer-program product comprising a non-transitory computer-usable medium having computer-readable program code embodied therein, the computer-readable program code adapted to be executed to implement a method comprising:

on power up, checking, by a transit-vehicle peripheral device, a transit-vehicle peripheral device programmable identifier;

wherein the transit-vehicle peripheral device programmable identifier is stored as a single value such that:
a specific initial value indicates that no particular transit-vehicle master controller has been assigned to the transit-vehicle peripheral device; and
any value other than the specific initial value identifies a particular transit-vehicle master controller of a particular wireless transit-vehicle network that has been assigned to the transit-vehicle peripheral device;

the transit-vehicle peripheral device wirelessly receiving a command packet;

the transit-vehicle peripheral device determining whether the command packet includes the transit-vehicle peripheral device programmable identifier;

responsive to the command packet including the specific initial value, the transit-vehicle peripheral device wirelessly receiving, from a transit-vehicle master controller of a wireless transit-vehicle network, a wireless transit-vehicle network common code that is common to all transit-vehicle peripheral devices within the wireless transit-vehicle network and storing, by the transit-vehicle peripheral device, the wireless transit-vehicle network common code as the transit-vehicle peripheral device programmable identifier, wherein the wireless transit-vehicle network common code replaces the specific initial value; and responsive to the command packet not including the transit-vehicle peripheral device programmable identifier, the transit-vehicle peripheral device not accepting the command packet.

* * * * *